United States Patent
Pashintsev et al.

(10) Patent No.: US 11,195,003 B2
(45) Date of Patent: Dec. 7, 2021

(54) FAST IDENTIFICATION OF TEXT INTENSIVE PAGES FROM PHOTOGRAPHS

(71) Applicant: EVERNOTE CORPORATION, Redwood City, CA (US)

(72) Inventors: Alexander Pashintsev, Cupertino, CA (US); Boris Gorbatov, Sunnyvale, CA (US); Eugene Livshitz, San Mateo, CA (US); Vitaly Glazkov, Moscow (RU)

(73) Assignee: EVERNOTE CORPORATION, Redwood City, CA (US)

( * ) Notice: Subject to any disclaimer, the term of this patent is extended or adjusted under 35 U.S.C. 154(b) by 189 days.

(21) Appl. No.: 16/455,543

(22) Filed: Jun. 27, 2019

(65) Prior Publication Data

US 2019/0318163 A1 Oct. 17, 2019

Related U.S. Application Data

(62) Division of application No. 15/272,744, filed on Sep. 22, 2016, now Pat. No. 10,372,981.
(Continued)

(51) Int. Cl.
*G06K 9/00* (2006.01)
*G06K 9/52* (2006.01)
(Continued)

(52) U.S. Cl.
CPC ..... *G06K 9/00456* (2013.01); *G06K 9/00463* (2013.01); *G06K 9/52* (2013.01); *G06T 3/40* (2013.01); *G06T 7/60* (2013.01)

(58) Field of Classification Search
CPC .. G06K 9/00456; G06K 9/00463; G06K 9/52; G06T 3/40; G06T 7/60
See application file for complete search history.

(56) References Cited

U.S. PATENT DOCUMENTS 4,741,046 A * 4/1988 Matsunawa ........ H04N 1/40062
358/462
5,754,709 A 5/1998 Moriya et al.
(Continued)

FOREIGN PATENT DOCUMENTS

JP 2010165217 A * 7/2010

OTHER PUBLICATIONS

Baqapuri, A.I. ("Deep Learning Applied to Image and Text Matching," arXiv: 1601.03478 [cs.LG], Sep. 14, 2015) (Year: 2015).*
(Continued)

*Primary Examiner* — Yubin Hung
(74) *Attorney, Agent, or Firm* — Morgan, Lewis & Bockius LLP

(57) ABSTRACT

Methods and systems for training a neural network to distinguish between text documents and image documents are described. A corpus of text and image documents is obtained. A page of a text document is scanned by shifting a text window to a plurality of locations. In accordance with a determination that the text in the window at a respective location meets text line criteria, the text in the window is stored as a respective text snippet. A plurality of image windows are superimposed over at least one page of an image document. In accordance with a determination that the content of a respective image window meets image criteria, content of the image window is stored as a respective image snippet. The respective text snippet and the respective image snippet are provided to a classifier.

20 Claims, 5 Drawing Sheets

Related U.S. Application Data

(60) Provisional application No. 62/222,368, filed on Sep. 23, 2015.

(51) Int. Cl.
*G06T 7/60* (2017.01)
*G06T 3/40* (2006.01)

(56) References Cited

U.S. PATENT DOCUMENTS

| | | | | |
|---|---|---|---|---|
| 5,933,525 | A * | 8/1999 | Makhoul | G06K 9/00879 382/186 |
| 6,466,954 | B1 * | 10/2002 | Kurosawa | G06K 9/00463 715/209 |
| 2001/0019334 | A1 * | 9/2001 | Carrai | G06T 3/403 345/670 |
| 2002/0018071 | A1 | 2/2002 | Ohnishi et al. | |
| 2002/0126313 | A1 | 9/2002 | Namizuka | |
| 2006/0013472 | A1 | 1/2006 | Kagitani | |
| 2006/0098231 | A1 | 5/2006 | Konishi | |
| 2007/0165950 | A1 | 7/2007 | Nishida | |
| 2008/0095442 | A1 * | 4/2008 | Ekin | G06K 9/325 382/187 |
| 2008/0244384 | A1 * | 10/2008 | Yoshitani | G06K 9/00456 715/251 |
| 2008/0309970 | A1 * | 12/2008 | Kobayashi | H04N 1/00864 358/1.15 |
| 2010/0215272 | A1 * | 8/2010 | Isaev | G06K 9/00469 382/182 |
| 2010/0220927 | A1 * | 9/2010 | Kim | H04N 1/40062 382/170 |
| 2010/0246961 | A1 * | 9/2010 | Prasad | G06K 9/723 382/181 |
| 2011/0188759 | A1 | 8/2011 | Filimonova et al. | |
| 2012/0224765 | A1 * | 9/2012 | Kim | G06K 9/325 382/159 |
| 2013/0129222 | A1 * | 5/2013 | Parameswaran | G06K 9/00456 382/195 |
| 2013/0177246 | A1 | 7/2013 | Stokes | |
| 2014/0079316 | A1 * | 3/2014 | Vitaladevuni | G06K 9/469 382/159 |
| 2014/0233055 | A1 * | 8/2014 | Eizenberg | G06F 3/1208 358/1.15 |
| 2014/0241629 | A1 | 8/2014 | Lerios et al. | |
| 2015/0117784 | A1 * | 4/2015 | Lin | G06K 9/4671 382/195 |
| 2015/0172508 | A1 | 6/2015 | Kimura | |
| 2015/0254555 | A1 * | 9/2015 | Williams, Jr. | G06N 3/0454 706/14 |
| 2015/0269135 | A1 * | 9/2015 | Kim | G06F 40/157 704/8 |
| 2016/0092754 | A1 * | 3/2016 | Kuznetsov | G06K 9/6203 382/282 |
| 2016/0210533 | A1 * | 7/2016 | Kiapour | G06K 9/3216 |
| 2017/0004374 | A1 * | 1/2017 | Osindero | G06K 9/325 |

OTHER PUBLICATIONS

Wong et al. ("Document Analysis System," IBM Journal of Research and Development, vol. 26, No. 6, Nov. 1982, pp. 647-656) (Year: 1982).

Hao et al. ("Nested segmentation: an approach for layout analysis in document classification," Proceedings of 2nd International Conference on Document Analysis and Recognition, Oct. 20-22, 1993) (Year: 1993).

* cited by examiner

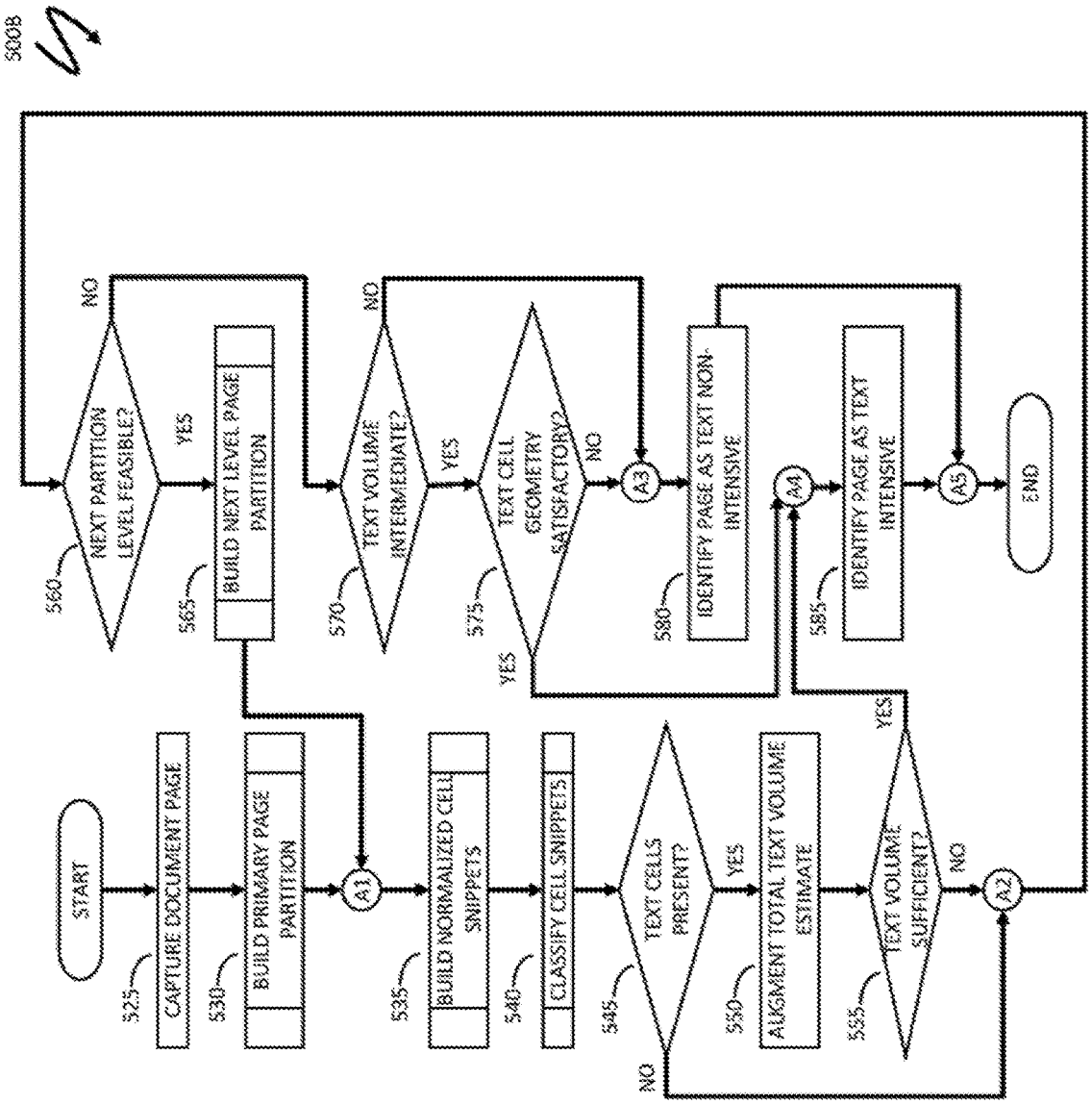

FAST IDENTIFICATION OF TEXT INTENSIVE PAGES FROM PHOTOGRAPHS

RELATED APPLICATIONS

This application is a divisional of U.S. patent application Ser. No. 15/272,744, filed Sep. 22, 2016, and entitled "FAST IDENTIFICATION OF TEXT INTENSIVE PAGES FROM PHOTOGRAPHS," which claims priority to U.S. Provisional Patent Application No. 62/222,368, filed Sep. 23, 2015, entitled, "FAST IDENTIFICATION OF TEXT INTENSIVE PAGES FROM PHOTOGRAPHS," both of which are hereby incorporated by reference in their entirety.

TECHNICAL FIELD

This application is directed to the field of image processing, and more particularly to the field of estimating volume of text on photographs of physical media via fast iterative process based on machine learning.

BACKGROUND OF THE INVENTION

Mobile phones with digital cameras are broadly available in every worldwide market. According to market statistics and forecasts, by 2018, annual smartphone shipments are expected to grow to 1.87 billion units; over 80% of all mobile phones will be arriving to customers with embedded digital cameras. New shipments will expand the already massive current audience of approximately 4.3 billion mobile phone users and 6.7 billion mobile subscribers; they will also update mobile phones currently used by the subscribers.

The volume of photographs taken with phone cameras is growing rapidly and begins to dominate online image repositories and offline storage alike. According to Pew Research, photographing with phone cameras remains the most popular activity of smartphone owners. InfoTrends has reported that the annual volume of digital photographs has nearly tripled between 2010 and 2015 and is expected to reach 1.3 trillion photographs in 2017, while the number of stored photos in 2017 may approach five trillion. It is projected that of the total 2017 volume of digital photographs, 79% will be taken by phone cameras, 8% by tablets and only 13% by conventional cameras. On social photo sharing sites, the volume of images taken with smartphones has long exceeded the quantity of photographs taken with any other equipment.

Hundreds of millions smartphone users are blending their everyday mobile work and home digital lifestyles with paper habits. Paper documents retain a significant role in the everyday information flow of business users and households. Digitizing and capturing of paper based information has further progressed with the arrival of multi-platform cloud-based content management systems, such as the Evernote service and software developed by Evernote Corporation of Redwood City, Calif., the Scannable software application for iPhone and iPad by Evernote and other document imaging software. These applications and services offer seamless capturing of multiple document pages and provide perspective correction, glare mitigation, advanced processing, grouping and sharing of scanned document pages. After the documents are captured and stored, the Evernote software and service further enhance user productivity with advanced document search capabilities based on finding and indexing text in images. Additionally, photographs that include images without significant amounts of surrounding text may be enhanced using advanced color correction methods for storage, sharing, printing, composition of documents and presentations, etc.

Determination of a relevant processing path for a scanned document page presents a challenging aspect of smartphone based scanning solutions. After initial pre-processing steps for a photographed page image have been accomplished (which may include glare mitigation, perspective and other spatial corrections, etc.), there may be several different directions for further image processing. Pages with significant amounts of text may be optimized for text retrieval and search purposes; accordingly, processing algorithms may increase contrast between the page text and the page background, which in many cases may result in a black-and-white image where the text is reliable separated from the rest of the image. On the other hand, images taken for aesthetical, illustration and presentation purposes typically undergo color correction and color enhancement steps that enrich color palette and attempt to adequately reproduce lighting conditions and provide a visually pleasing balance between contrasting and smooth image areas. Therefore, errors in determining adequate processing paths for captured images may lead to expensive and unnecessary post-processing diagnostics, double processing steps and an undesired need for user intervention.

Accordingly, it would be useful to develop efficient mechanisms for quick automatic identification of document page photographs as text vs. image types at early processing steps of automatic mobile image scanning and processing.

SUMMARY OF THE INVENTION

According to the system described herein, determining if a document is a text page includes partitioning the document into a plurality of cells, scaling each of the cells to a standardized number of pixels to provide a corresponding snippet for each of the cells, using a classifier to examine the snippets to determine which of the cells are classified as text and which of the cells are not classified as text, determining a volume of text for the document based on a total amount of text in the document corresponding to a sum of an amount of text in each of the cells classified as text, and determining that the document is a text page in response to the total amount exceeding a pre-determined threshold. In response to the total amount being less than the pre-determined threshold, cells not classified as text may be examined further. Further examining cells not classified as text may include subdividing ones of the cells not classified as text to provide further subdivisions and using the classifier to determine which of the subdivisions are classified as text and to determine a revised total amount based on an additional volume of text according to the subdivisions classified as text to add to the total amount. Determining if a document is a text page may also include determining that the document is a text page in response to the revised total amount exceeding the pre-determined threshold. The classifier may examine the subdivisions in a random order or in an order that prioritizes subdivisions adjacent to snippets previously classified as text. Determining if a document is a text page may also include determining that the document is a text page in response to cells that are classified as text having a satisfactory geometry. At least some of the cells corresponding to snippets that are classified as text may be aligned to form at least one text line and the at least one text line may be horizontal or vertical. The snippets that are not classified as text may be classified as images. The snippets that are not classified as text may be classified images or unknown. The document may be partitioned into six cells. The document may be captured using a smartphone. The classifier may be provided by training a neural net using a plurality of image documents and a plurality of text pages having various formats, layouts, text sizes, ranges of word, line and paragraph spacing.

According further to the system described herein, training a neural network to distinguish between text documents and image documents includes obtaining a corpus of text and image documents, for each of the text documents, creating text snippets by scanning each of the text document with a window that is shifted horizontally and vertically and discarding text documents for which the window contains less than a first number of lines of text or more than a second number of lines of text, for each of the image documents, creating image snippets by scanning each of the image document with a window that is shifted horizontally and vertically, normalizing resolution of the windows, and providing the text snippets and the image snippets to a classifier. Normalizing resolution of the windows may include converting each of the windows to a 32×32 pixel resolution. The first number of lines of text may be two and the second number of lines may be four. The classifier may be an MNIST-style Neural Network, provided through Google TensorFlow.

According further to the system described herein, a non-transitory computer readable medium contains software that determines if a document is a text page. The software includes executable code that partitions the document into a plurality of cells, executable code that scales each of the cells to a standardized number of pixels to provide a corresponding snippet for each of the cells, executable code that uses a classifier to examine the snippets to determine which of the cells are classified as text and which of the cells are not classified as text, executable code that determines a volume of text for the document based on a total amount of text in the document corresponding to a sum of an amount of text in each of the cells classified as text, and executable code that determines that the document is a text page in response to the total amount exceeding a pre-determined threshold. In response to the total amount being less than the pre-determined threshold, cells not classified as text may be examined further. Further examining cells not classified as text may include subdividing ones of the cells not classified as text to provide further subdivisions and using the classifier to determine which of the subdivisions are classified as text and to determine a revised total amount based on an additional volume of text according to the subdivisions classified as text to add to the total amount. The software may also include executable code that determines that the document is a text page in response to the revised total amount exceeding the predetermined threshold. The classifier may examine the subdivisions in a random order or in an order that prioritizes subdivisions adjacent to snippets previously classified as text. The software may also include executable code that determines that the document is a text page in response to cells that are classified as text having a satisfactory geometry. At least some of the cells corresponding to snippets that are classified as text may be aligned to form at least one text line and the at least one text line may be horizontal or vertical. The snippets that are not classified as text may be classified as images. The snippets that are not classified as text may be classified images or unknown. The document may be partitioned into six cells. The document may be captured using a smartphone. The classifier may be provided by training a neural net using a plurality of image documents and a plurality of text pages having various formats, layouts, text sizes, ranges of word, line and paragraph spacing.

According further to the system described herein, a non-transitory computer readable medium contains software that trains a neural network to distinguish between text documents and image documents using a corpus of text and image documents. The software includes executable code that creates, for each of the text documents, text snippets by scanning each of the text document with a window that is shifted horizontally and vertically and discarding text documents for which the window contains less than a first number of lines of text or more than a second number of lines of text, executable code that creates, for each of the image documents, image snippets by scanning each of the image document with a window that is shifted horizontally and vertically, executable code that normalizes resolution of the windows, and executable code that provides the text snippets and the image snippets to a classifier. Normalizing resolution of the windows may include converting each of the windows to a 32×32 pixel resolution. The first number of lines of text may be two and the second number of lines may be text is four. The classifier may be an MNIST-style Neural Network, provided through Google TensorFlow.

The proposed system offers an automatic identification of document page photographs as text intensive pages (or not) by selective hierarchical partitioning and zooming down of page areas into normalized snippets, classifying snippets using a pre-trained text/image classifier, and accumulating reliably identified text areas until a threshold for sufficient text content is achieved; if an iterative process has not revealed a sufficient amount of text, the page is deemed not to be a text page (i.e., an image page).

At a preliminary phase of system development, large corpuses of text and image content may be obtained and used for training of a robust text/image classifier based on neural network or other classification mechanisms. The classifier is built to distinguish small snippets of text pages that enclose low number of text lines (and therefore have a characteristic linear geometry) from snippets of images that represent a non-linear variety and more complex configuration of shapes within a snippet.

Accordingly, at a pre-processing phase for the corpus of training textual material, the following preparation steps preceding automatic classification are performed:
  A. Text lines on each page of an arbitrary text document in the text corpus are identified.
  B. The page is scanned with a small window that is shifted horizontally and vertically along the page.
  C. Windows obtained during the previous step that contain a predefined range of text lines (in an embodiment, two to four lines of text, irrespective of text size in each line), are stored for future training of the classifier. Prior to training, a size of windows is normalized to a standard low-res format (in an embodiment, 32×32 pixels) so that all snippets reflecting configurations of text lines and a split into words of the text lines have the same size.

Similarly, portions of individual images in the image corpus may be obtained, preprocessed substantially in the same way as text pages, normalized to the same snippet size and stored. The differences in building text vs. image snippet collections are the criteria for choosing or discarding a square portion of content:
  in case of text, choosing or discarding a content window is driven by line count (a predefined number of text lines within a window);

in case of images (non-text), windows of different size may be superimposed upon each image, shifted along the image and then normalized to the standard snippet size; an acceptance or rejection of a particular window may be related to a percent of a window occupied by the image, as opposed to the background.

The two collections of content snippets (text and images snippets) are subsequently used for training and testing a text/image classifier using standard methods, such as neural networks. Depending on the use of the classifier (e.g. one or two acceptance thresholds), it may categorize a new input snippet using a binary response <text/image> or a ternary response <text/image/unknown>.

After the text/image classifier has been created, the run-time system functioning may include the following:

1. A document page may be captured using a smartphone camera or other photographic or scanning mechanism.
2. A page image may be partitioned into a primary grid containing a relatively small number of cells (in an embodiment, 6 to 25 primary cells).
3. Each cell of the partition may be normalized—typically, scaled down to the standard snippet size (for example, 32×32 pixels, as explained elsewhere herein).
4. The text/image classifier may be applied to each snippet corresponding to the page partition.
5. For snippets that are reliably classified as text, text volume may be continuously accumulated and the snippets are excluded from the subsequent page analysis and classification.
6. If the primary partition yields sufficient text volume (in an embodiment, above 50% of the estimated total page content counted as if it was all text), the whole page image may be categorized as text and the system work for that page image is completed by declaring the page text intensive (i.e., the page is classified as a text page), which may define the subsequent image processing path, as explained elsewhere herein.
7. If the primary partition does not provide a sufficient text volume, cells of the primary partition that have been initially rejected, i.e. categorized as image or unknown objects rather than text objects, may be subsequently split into a secondary partition, and previous steps may be repeated. The reason for such iterative partitioning is that the classifier may reject an original cell containing a mix of text and images and may be able to reliably classify smaller portion(s) of the cell as text following subdivision of the original cell.
8. After several iterations, the system either discovers a sufficient amount of text to qualify the whole page image as a text page or further partitioning stops because the cell size becomes too small. There are two additional options available in case when the partitioning stops but the page has not revealed a sufficient text volume to categorize it as a text intensive page, as explained in the subsequent subsections.
9. If the text volume is below a lower bound (for example, 25% in an embodiment where the upper bound is 50% for reliable text wise categorization), then the page may be rejected as a text intensive object (i.e., classified as an image page or unknown).
10. If the text volume is intermediate, i.e. between the lower bound and the reliable text categorization bound (for example, 30% in the case of the 25%/50% lower/upper bounds), then additional analysis of geometry of the text cells may be conducted. For example, if the merged text cells form a desirable shape, such as a horizontal or a vertical line, then the page may still be accepted as a text intensive page, associated with such widespread document pages as a large image with an accompanying text located above, below or on one or both sides of the image. Even though the relative volume of text is low, the text can still be important and require an adequate processing path, as explained elsewhere herein.

In some embodiments, various empiric optimization techniques may be used to further accelerate the decision process. Examples may include, without limitation:

Prior to a next partition of a particular cell (that has not been identified as text at a previous iteration), the system may first classify a half-size concentric cell within the particular cell in a hope to quickly retrieve text.

The order of processing cells of a secondary partition may give priority to cells adjacent to previously identified text cells, in an attempt to quickly expand text areas on the page image.

Randomization of subsequent page partitions (cell size, cell recall order) may be used to overcome systematic errors.

BRIEF DESCRIPTION OF THE DRAWINGS

Embodiments of the system described herein will now be explained in more detail in accordance with the figures of the drawings, which are briefly described as follows.

FIGS. 5A and 5B are system flow diagrams illustrating processing performed in connection with system activities, according to embodiments of the system described herein.

DETAILED DESCRIPTION OF VARIOUS EMBODIMENTS

The system described herein provides a mechanism for fast identification of text intensive pages from page photographs or scans by selective hierarchical partitioning and zooming down of page areas into normalized snippets, classifying snippets using a pre-trained text/image classifier, and accumulating reliably identified text areas until a threshold for sufficient text content is achieved.

Figure 1:
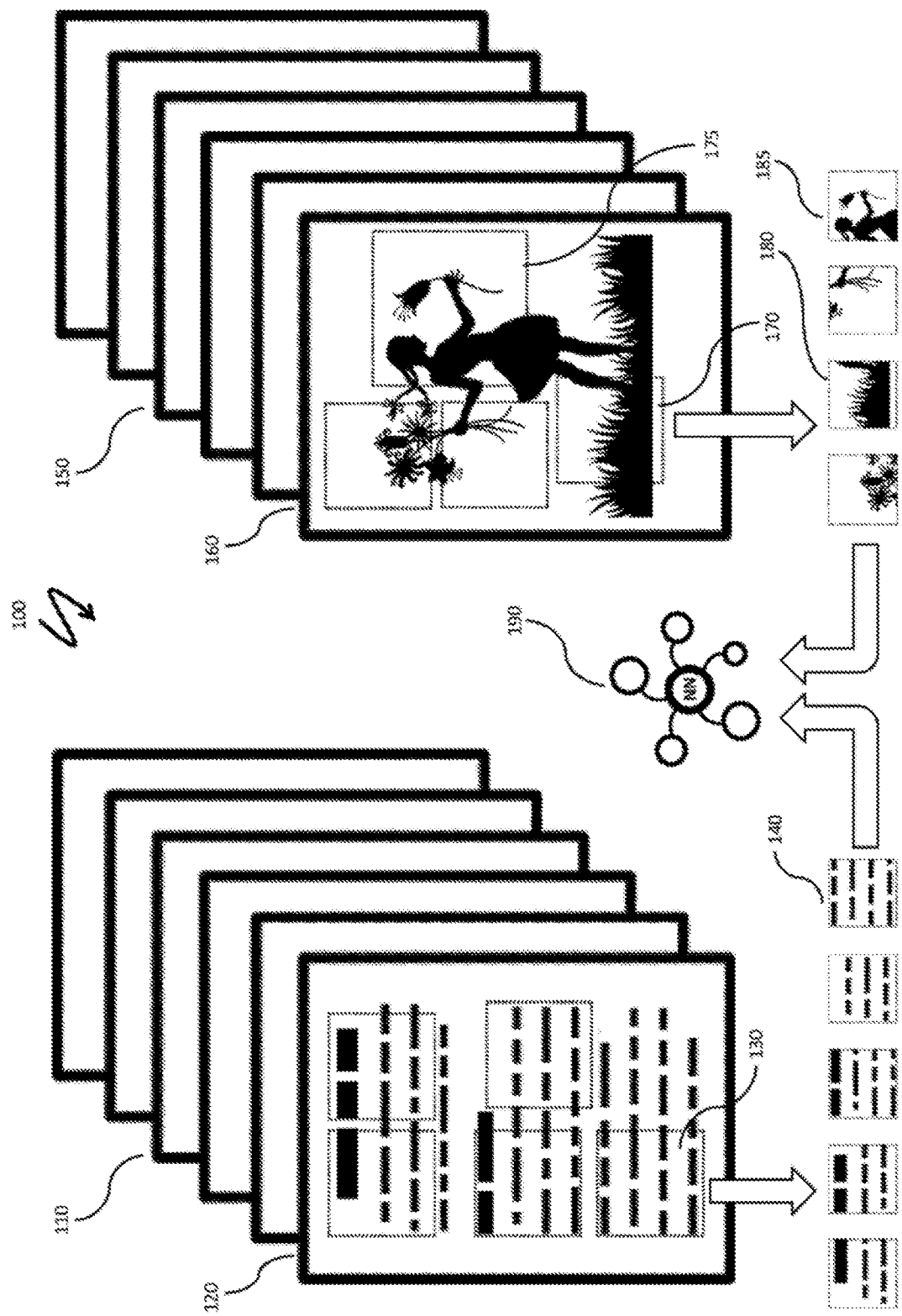
FIG. 1 is a schematic illustration of preparing text and image snippets for training of the text/image classifier, according to embodiments of the system described herein.

FIG. 1 is a schematic illustration 100 of preparing text and image snippets for training of the text/image classifier. A text corpus 110 contains multiple photographed and/or scanned snapshots of text pages 120 in various formats, layouts, text sizes, ranges of word, line and paragraph spacing and other parameters defining text documents. Each page 120 is scanned with a sliding window 130 (different positions of the window 130 are shown as dotted squares on one of the pages 120). Content fragments (snippets) within each window are evaluated and a decision is made whether to add a snippet to training material or discard the snippet according to criteria explained elsewhere herein. Staying snippets (not discarded) are normalized to standard size (for example, 32×32 pixels) and corresponding normalized text snippets 140 are added to a collection of training material. Analogously, an image corpus 150 includes multiple images 160. Each of the images 160 is scanned with sliding windows 170, 175 that may change in size, producing, after filtering out snippets with inadequate content and normalization, a training set of normalized image snippets 180, 185. The two sets of training material, normalized text snippets 140 and normalized image snippets 180, 185, are used to train a classifier 190, which may be implemented using neural network or other appropriate technologies. In an embodiment herein, that classifier 190 is an MNIST-style Neural Network, provided through Google TensorFlow. However, any other appropriate type of neural networks, and/or other types of intelligent, adaptable, and trainable classification systems may be used.

In an embodiment herein, text lines on each page of an arbitrary text document in the text corpus 110 are identified (e.g., by an operator) prior to adding the text document to the text corpus 110. A separate training module (not shown) scans the text document with a small window that is shifted horizontally and vertically along the page. Windows that contain a predefined range of text lines (in an embodiment, two to four lines of text, irrespective of text size in each line), are stored for future input and training of the classifier 190. Prior to training, a size of windows is normalized to a standard low-res format (in an embodiment, 32×32 pixels) so that all text snippets reflecting configurations of text lines and a split into words of the text lines have a same size. The training module also obtains image snippets from the image corpus 150 in a similar manner and then provides the text snippets along with image snippets to the classifier 190 for training.

Figure 2:
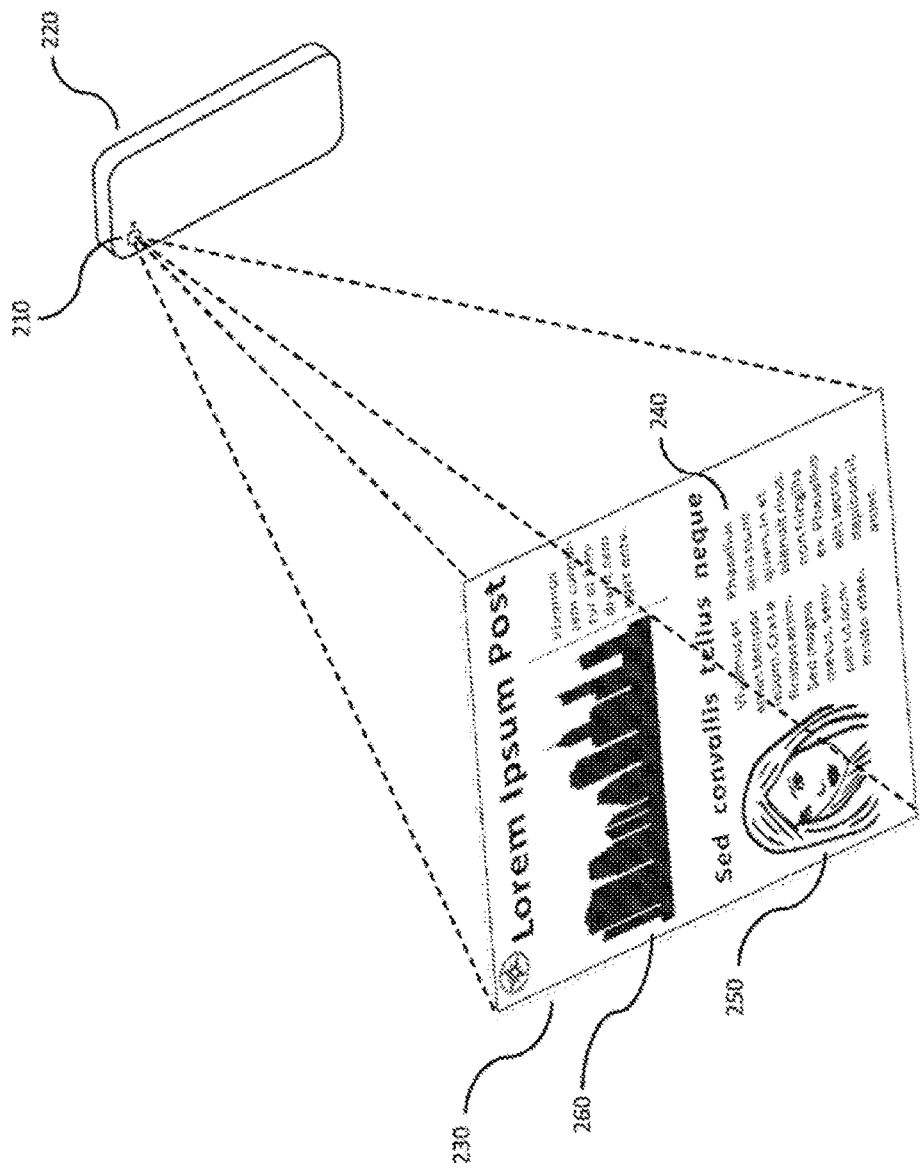
FIG. 2 schematically illustrates capturing a document page containing a mix of text and images with a smartphone camera, according to embodiments of the system described herein.

FIG. 2 is a schematic illustration 200 of capturing a document page containing a mix of text and images with a camera 210 of a smartphone 220 (or other appropriate mobile device). A user of the system targets the camera 210 of the smartphone 220 to capture a document page 230 (or other physical media object) that may contain text 240 and images 250, 260 of different types. The system described herein determines whether the page contains a sufficient amount of text (is a text page) to justify a text-related processing path of the photograph.

Figure 3:
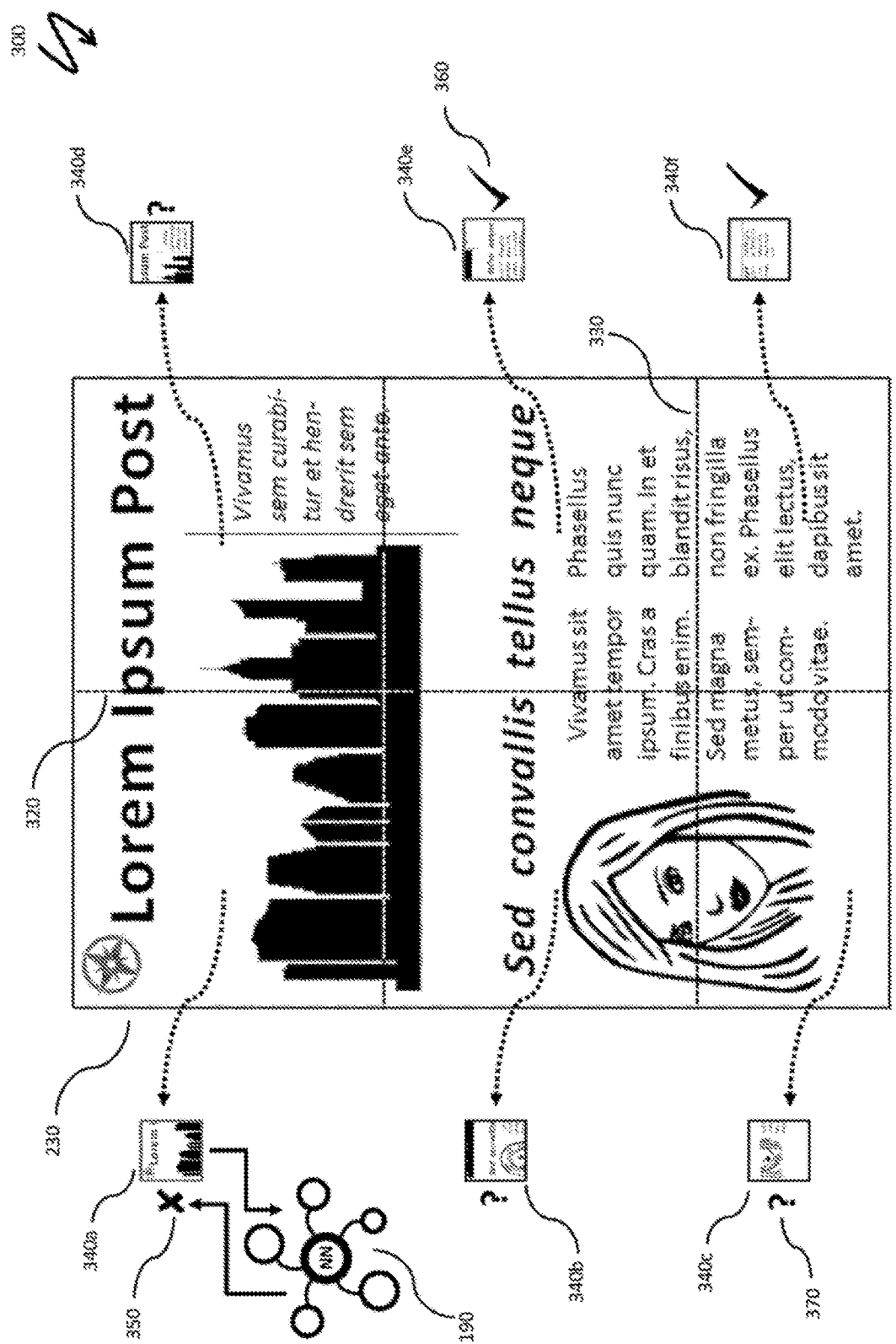
FIG. 3 is a schematic illustration of an original, primary partition of a document page and of the classification of each cell of a partition, according to embodiments of the system described herein.

FIG. 3 is a schematic illustration 300 of an original, primary partition of a document page and of the classification of each cell of the partition. The document page 230 is split into a primary partition of cells; there is a total of six cells, as shown by a grid of vertical dashed lines 320 and horizontal dashed lines 330. Within each cell, a normalized snippet is associated for automatic classification purpose, as explained elsewhere herein, thus generating a set of six normalized snippets 340*a*-340*f* (dotted connector arrows in FIG. 3 show the correspondence between cells and normalized snippets). Each of the snippets 340*a*-340*f* is processed by the classifier 190 to determine a type thereof: <text/image> in case of a binary classifier or <text/image/unknown> in case of a ternary classifier, as explained elsewhere herein. In FIG. 3, a ternary classifier is used. Snippets classified as images are ignored, as illustrated by a deletion sign 350; cells corresponding to snippets that are classified as text may, under some conditions (for example, in the case of binary classifier), be further processed. Cells for which normalized snippets are classified as text may be immediately accepted, as illustrated by a checkmark 360. An estimate of text volume associated with each accepted textual cell of the partition may be accumulated through all cells and phases of the partition. In FIG. 3, the two snippets 340*e*, 340*f* are classified as text and a volume of text from the cells 340*e*, 340*f* is accumulated in a page count of text volume. Cells classified as unknown may represent a mix of text and image content, as illustrated, for example, by the snippet 340*b* and indicated by a question mark 370. If a cumulative volume of text from accepted cells has not reached a threshold for classification as a text intensive page, cells classified as unknown may represent priority candidates for further split and additional search for text. FIG. 3 shows three cells corresponding to the snippets 340*b*, 340*c*, 340*d* as such candidates; all of the cells with which the snippets 340*b*, 340*c*, 340*d* are associated will be further split into sub-cells in a secondary partition.

Figure 4:
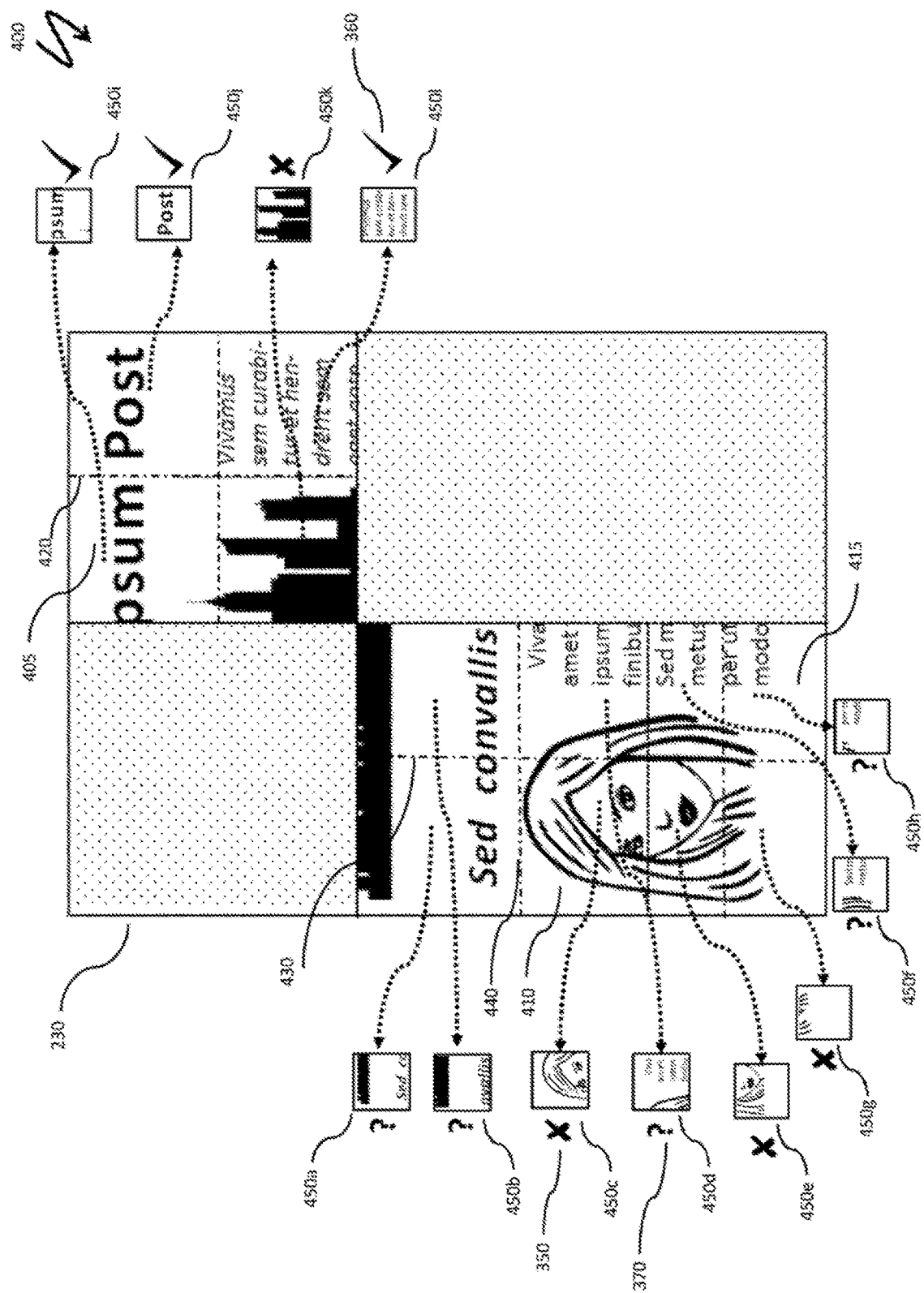
FIG. 4 is a schematic illustration of a secondary, additional partition of a document page and classification of partition cells, according to embodiments of the system described herein.

FIG. 4 is a schematic illustration 400 of a secondary, additional partition of the document page 230 and the corresponding classification of partition cells. FIG. 4 illustrates secondary partition of three cells 405, 410, 415 of the document page 230. Each of the cells 405, 410, 415 is subdivided into four secondary cells, as shown by dash-dotted lines 420, 430, 440. Accordingly, a secondary partition of the cells 405, 410, 415 generates twelve cells; associated normalized snippets 450*a*-450*l* are shown in FIG. 4 with assigned classification results depicted by rejection signs 350, acceptance signs 360 and unknown type signs 370. Three in twelve of the snippets 450*a*-450*l* of the secondary partition in FIG. 4, namely, the snippets 450*i*, 450*j*, 450*l*, contribute additional textual information to a cumulative text count on the document page 230.

The process of subsequent partitions may continue until either the document page 230 is categorized as a text intensive page or process termination criteria are met, as explained elsewhere herein (and the page is not declared text intensive).

Referring to FIG. 5A, a flow diagram 500A illustrates processing performed in connection with training the classifier 190. Processing starts at a step 510 where text and image corpuses are obtained for training purposes. After the step 510, processing proceeds to a step 515, where the system creates, filters though and normalizes original and normalized content snippets from text and image data, as explained elsewhere herein (see, in particular, FIG. 1 and the accompanying text). After the step 515, processing proceeds to a step 520, where the system builds text/image classifier based on the training data. Following the step 520, processing is complete.

Referring to FIG. 5B, a flow diagram 500B illustrates processing performed in connection with using the classifier 190 to classify a document page. Processing begins at a step 525, where a user captures a document page or other unit of physical media (see FIG. 2 and the accompanying text). After the step 525, processing proceeds to a step 530, where the system builds a primary page partition, as explained elsewhere herein, for example, in connection with FIG. 3. After the step 530, processing proceeds to a step 535, where the system builds normalized cell snippets for the cells of the current partition (which is a primary partition at the first iteration but may be a secondary partition if there are multiple iterations). After the step 535, processing proceeds to a step 540, where the system uses the classifier 190 to process cell snippets, as explained elsewhere herein (see, for example, FIG. 3 and the accompanying text).

After the step 540, processing proceeds to a test step 545, where it is determined whether text cells (cells of the current partition for which normalized snippets have been classified as text) are present. If so, processing proceeds to a step 550 where a previous count of total text volume of the document page is augmented with a cumulative text volume in the text cells of the current partition. After the step 550, processing proceeds to a test step 555, where it is determined whether a total text volume detected in all previously identified text cells is sufficient to identify the document page as a text intensive page. If not, processing proceeds to a test step 560, where it is determined whether a next partition level is feasible, according to criteria explained elsewhere herein. Note that the step 560 can also be reached directly from the test step 545 if it was determined at the step 545 that text cells are not present in a current partition. If the next partition level is feasible, processing proceeds to a step 565, where the system builds a next level of page partition, as illustrated in FIG. 4 and explained in the accompanying text. After the step 565, processing proceeds back to the step 535. If it was determined at the test step 555 that an accumulated text volume from all previously identified text cells is sufficient, processing proceeds to a step 585 where the document page is identified as a text intensive page. After the step 585, processing is complete. If it was determined at the test step 560 that the next partition level is not feasible (in other words, the termination criteria for the partition process have been met), processing proceeds to a test step 570 where it is determined whether a total text volume detected in all previously identified text cells is at an intermediate level, i.e. insufficient to either identify the page as text intensive or reject the document page as a text non-intensive. If so, processing proceeds to a test step 575, where it is determined whether, nonetheless, a geometry of identified text cells is satisfactory to categorize the document page as a text intensive page, in spite of falling below the reliable text volume threshold (i.e., identified cells are aligned to form one or several horizontal text lines). If the geometry of identified text cells is satisfactory to categorize the document page as a text intensive page, processing proceeds to the step 585, described above, where the page is identified as text intensive. Following the step 585, processing is complete. Otherwise, if the geometry of identified text cells is not satisfactory to categorize the document page as a text intensive page, control transfers from the step 575 to a step 580 where the page is identified as text non-intensive (i.e. rejected as a text page). After the step 580, processing is complete. Note that the step 580 may be independently reached from the test step 570 if it was determined at the step 570 that the text volume is not intermediate.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device used for page capturing may be a cell phone with a camera, although other devices are also possible.

Note that the mobile device(s) may include software that is pre-loaded with the device, installed from an app store, installed from a desktop (after possibly being pre-loaded thereon), installed from media such as a CD, DVD, etc., and/or downloaded from a Web site. The mobile device may use an operating system such as iOS, Android OS, Windows Phone OS, Blackberry OS and mobile versions of Linux OS.

Software implementations of the system described herein may include executable code that is stored in a computer readable medium and executed by one or more processors, including one or more processors of a desktop computer. The desktop computer may receive input from a capturing device that may be connected to, part of, or otherwise in communication with the desktop computer. The desktop computer may include software that is pre-loaded with the device, installed from an app store, installed from media such as a CD, DVD, etc., and/or downloaded from a Web site. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of training a neural network to distinguish between text documents and image documents, comprising:
    obtaining a corpus of text and image documents;
    for at least one text document of the corpus of text and image documents:
        scanning at least one page of the at least one text document by shifting a text window to a plurality of locations on the at least one page of the at least one text document to capture a plurality of partial lines of text;
        determining whether text in the window at a respective location of the plurality of locations meets text line criteria; and
        in accordance with a determination that the text in the window at the respective location of the plurality of locations meets text line criteria, storing the text in the window as a respective text snippet; and
    for at least one image document of the corpus of text and image documents:
        superimposing a plurality of image windows over at least one page of the at least one image document;
        determining whether the content of a respective image window meets image criteria; and
        in accordance with a determination that the content of the respective image window meets the image criteria, storing the content of the respective image window as a respective image snippet; and
    providing the respective text snippet and the respective image snippet to a classifier as a part of training the classifier to distinguish between text documents and image documents.

2. The method of claim 1, wherein the text line criteria include first criteria that are met in accordance with a determination that a number of lines of text in the text in the window at the respective location of the plurality of locations is greater than a first predetermined number of lines of text.

3. The method of claim 2, wherein the text line criteria include second criteria that are met in accordance with a determination that a number of lines of text in the text in the window at the respective location of the plurality of locations is fewer than a second predetermined number of lines of text.

4. The method of claim 3, wherein the first predetermined number of lines of text is two and the second predetermined number of lines of text is four.

5. The method of claim 1, wherein the image criteria include criteria that are met in accordance with a determination that a portion of the content of the respective image window occupied by non-background content exceeds a predetermined threshold amount of non-background content.

6. The method of claim 1, wherein a first image window of the plurality of image windows has a first size that is different from a second size of a second image window of the plurality of image windows.

7. The method of claim 1, including normalizing the size of a plurality of text snippets that include the respective text snippet.

8. The method of claim 7, wherein normalizing the size of the plurality of text snippets includes converting each of the text snippets to a 32×32 pixel resolution.

9. The method of claim 7, including normalizing the size of a plurality of image snippets that include the respective image snippet.

10. The method of claim 9, wherein:
the plurality of text snippets and the plurality of image snippets are added to a collection of training material; and
the classifier is trained based on the collection of training material.

11. The method of claim 1, wherein the classifier is a Neural Network.

12. A computing device for training a neural network to distinguish between text documents and image documents, comprising:
one or more processors;
memory;
a display; and
one or more programs stored in the memory and configured for execution by the one or more processors, the one or more programs comprising instructions for:
obtaining a corpus of text and image documents;
for at least one text document of the corpus of text and image documents:
scanning at least one page of the at least one text document by shifting a text window to a plurality of locations on the at least one page of the at least one text document to capture a plurality of partial lines of text;
determining whether text in the window at a respective location of the plurality of locations meets text line criteria; and
in accordance with a determination that the text in the window at the respective location of the plurality of locations meets text line criteria, storing the text in the window as a respective text snippet; and
for at least one image document of the corpus of text and image documents:
superimposing a plurality of image windows over at least one page of the at least one image document;
determining whether the content of a respective image window meets image criteria; and in accordance with a determination that the content of the respective image window meets the image criteria, storing the content of the respective image window as a respective image snippet; and
providing the respective text snippet and the respective image snippet to a classifier as a part of training the classifier to distinguish between text documents and image documents.

13. The computing device of claim 12, wherein the text line criteria include first criteria that are met in accordance with a determination that a number of lines of text in the text in the window at the respective location of the plurality of locations is greater than a first predetermined number of lines of text.

14. The computing device of claim 13, wherein the text line criteria include second criteria that are met in accordance with a determination that a number of lines of text in the text in the window at the respective location of the plurality of locations is fewer than a second predetermined number of lines of text.

15. The computing device of claim 14, wherein the first predetermined number of lines of text is two and the second predetermined number of lines of text is four.

16. The computing device of claim 12, wherein the image criteria include criteria that are met in accordance with a determination that a portion of the content of the respective image window occupied by non-background content exceeds a predetermined threshold amount of non-background content.

17. The computing device of claim 12, wherein a first image window of the plurality of image windows has a first size that is different from a second size of a second image window of the plurality of image windows.

18. The computing device of claim 12, including normalizing the size of a plurality of text snippets that include the respective text snippet.

19. The computing device of claim 18, wherein normalizing the size of the plurality of text snippets includes converting each of the text snippets to a 32×32 pixel resolution.

20. A non-transitory computer readable medium containing software that trains a neural network to distinguish between text documents and image documents using a corpus of text and image documents, the software comprising executable code that:
obtains a corpus of text and image documents;
for at least one text document of the corpus of text and image documents:
scans at least one page of the at least one text document by shifting a text window to a plurality of locations on the at least one page of the at least one text document to capture a plurality of partial lines of text;
determines whether text in the window at a respective location of the plurality of locations meets text line criteria; and
in accordance with a determination that the text in the window at the respective location of the plurality of locations meets text line criteria, stores the text in the window as a respective text snippet; and
for at least one image document of the corpus of text and image documents:
superimposes a plurality of image windows over at least one page of the at least one image document;
determines whether the content of a respective image window meets image criteria; and in accordance with a determination that the content of the respective image window meets the image criteria, stores the content of the respective image window as a respective image snippet; and provides the respective text snippet and the respective image snippet to a classifier as a part of training the classifier to distinguish between text documents and image documents.

\* \* \* \* \*